United States Patent
Li et al.

(10) Patent No.: US 10,809,549 B2
(45) Date of Patent: Oct. 20, 2020

(54) LIQUID CRYSTAL DROPPING DEVICE

(71) Applicant: Shenzhen China Star Optoelectronics Semiconductor Display Technology Co., Ltd., Shenzhen (CN)

(72) Inventors: Xiang Li, Shenzhen (CN); Chung-Ching Hsieh, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 8 days.

(21) Appl. No.: 15/577,776

(22) PCT Filed: Oct. 18, 2017

(86) PCT No.: PCT/CN2017/106754
§ 371 (c)(1),
(2) Date: Nov. 29, 2017

(87) PCT Pub. No.: WO2019/015148
PCT Pub. Date: Jan. 24, 2019

(65) Prior Publication Data
US 2019/0025618 A1     Jan. 24, 2019

(30) Foreign Application Priority Data
Jul. 20, 2017   (CN) .......................... 2017 1 0595587

(51) Int. Cl.
G02F 1/13      (2006.01)
G02F 1/1341    (2006.01)

(52) U.S. Cl.
CPC .......... *G02F 1/1303* (2013.01); *G02F 1/1341* (2013.01); *G02F 2001/13415* (2013.01)

(58) Field of Classification Search
USPC .................................. 118/313–315; 349/129
See application file for complete search history.

(56) References Cited

U.S. PATENT DOCUMENTS

| | | | |
|---|---|---|---|
| 2004/0149834 A1* | 8/2004 | Shimoda | H01L 51/0005 239/135 |
| 2005/0260426 A1* | 11/2005 | Kwok | G02F 1/133711 428/473.5 |
| 2010/0104740 A1* | 4/2010 | Shinohara | B41J 2/15 427/66 |
| 2011/0199566 A1* | 8/2011 | Mazusaki | C08G 73/1039 349/123 |

(Continued)

FOREIGN PATENT DOCUMENTS

| | | |
|---|---|---|
| CN | 1635402 A | 7/2005 |
| CN | 102102650 A | 6/2011 |

(Continued)

*Primary Examiner* — Yewebdar T Tadesse
(74) *Attorney, Agent, or Firm* — Mark M. Friedman

(57) ABSTRACT

A liquid crystal dropping device is provided. A machine table is divided into at least two regions and a liquid crystal dropping nozzle is disposed corresponding to each of the regions. Liquid crystal compositions provided by the liquid crystal dropping nozzles corresponding to the regions are different when liquid crystal panels of different properties are placed in respective regions. In such a way, during manufacturing products of different sizes on a same substrate, performance of each product can meet standards.

1 Claim, 1 Drawing Sheet

(56) References Cited

U.S. PATENT DOCUMENTS

2013/0267143 A1   10/2013  Kim et al.
2015/0042939 A1*  2/2015  Park ................. G02F 1/134336
                                                                         349/144
2015/0255487 A1*  9/2015  Yoshida ................ G02F 1/1345
                                                                         257/43

FOREIGN PATENT DOCUMENTS

| | | |
|---|---|---|
| JP | 2008221131 A | 9/2008 |
| WO | 2006021999 A1 | 3/2006 |

* cited by examiner

LIQUID CRYSTAL DROPPING DEVICE

CROSS REFERENCE TO RELATED APPLICATION

This application claims the priority of International Application No. PCT/CN2017/106754, filed on Oct. 18, 2017, which claims priority to Chinese Application No. 201710595587.9 filed on Jul. 20, 2017. The entire disclosures of each of the applications are incorporated herein by reference.

BACKGROUND

1. Field of the Disclosure

The present disclosure relates to liquid crystal panel technologies, and more particularly to a liquid crystal dropping device.

2. Description of Related Art

With improvement of people's living standards, large-size liquid crystal televisions have become increasingly popular among consumers. Changing liquid crystal televisions from small to large size has become a trend. Accordingly, large-size panels have good market prospects and positive development trends. However, due to generation restrictions, merely producing the large-size panels in a single size will cause economic benefit issues, such as low capacity utilization rates and high manufacturing cost, and this limits the market development.

A Multi-Mode Glass (MMG) approach is used to improve this defect, that is, two liquid crystal panels of different sizes are mixed on a same glass substrate. This greatly increases utilization of the glass substrate. For example, in 8.5G line, the utilization rate is only 75% for cutting the liquid crystal panels merely into 43 inches but the utilization rate reaches 97% when the liquid crystal panels are cut into 43 inches and 22 inches.

However, in the MMG approach, if two liquid crystal panels are different in pixel density and aperture rate on the transistor side, adopting a traditional liquid crystal alignment and curing approach will cause alignment incompatibility for the two types of products. For example, one may have a large pretilt angle and may be too bright in a dark state. The other may have a small pretilt angle and may be bad in recovery after the liquid crystal is pressed, and residual images may appear.

Therefore, there is a need to provide an alignment device in order to solve the problems in the existing skills.

SUMMARY

The objective of the present disclosure is to provide a liquid crystal dropping device for solving the problem of alignment incompatibility for liquid crystal panels of different sizes in using the existing MMG approach to manufacture the liquid crystal panels on a substrate.

To achieve above objective, the present disclosure provides a liquid crystal dropping device including a machine table divided into at least two regions; and a liquid crystal dropping nozzle corresponding to each of the regions, wherein liquid crystal compositions provided by the liquid crystal dropping nozzles corresponding to the regions are different when liquid crystal panels of different properties are placed in respective regions, causing a same pretilt angle to be formed in an alignment process for the liquid crystal panels in different regions; wherein the liquid crystal panels of different properties have different sizes, and each liquid crystal dropping nozzle corresponds to a liquid crystal container and a transport pipeline; wherein the liquid crystal dropping nozzle communicates with the liquid crystal container via the transport pipeline, and the liquid crystal dropping nozzle is configured to draw the liquid crystal composition from the liquid crystal container and drop the liquid crystal composition onto the liquid crystal panel in a corresponding region.

In the liquid crystal dropping device of the present disclosure, the liquid crystal composition provided by each liquid crystal dropping nozzle comprises liquid crystal molecules and a reactive monomer, and the reactive monomers of the liquid crystal compositions provided by the liquid crystal dropping nozzles are different in composition or concentration.

In the liquid crystal dropping device of the present disclosure, the liquid crystal compositions provided by the liquid crystal dropping nozzles corresponding to the regions are identical when the liquid crystal panels of a same property are placed in the respective regions.

In the liquid crystal dropping device of the present disclosure, compositions of the reactive monomers of the liquid crystal compositions corresponding to different regions are adjusted to form the same pretilt angle for the liquid crystal panels in different regions.

In the liquid crystal dropping device of the present disclosure, concentration of the reactive monomers of the liquid crystal compositions corresponding to different regions is adjusted to form the same pretilt angle for the liquid crystal panels in different regions.

To achieve above objective, the present disclosure further provides a liquid crystal dropping device including a machine table divided into at least two regions; and a liquid crystal dropping nozzle corresponding to each of the regions, wherein liquid crystal compositions provided by the liquid crystal dropping nozzles corresponding to the regions are different when liquid crystal panels of different properties are placed in respective regions, causing a same pretilt angle to be formed in an alignment process for the liquid crystal panels in different regions.

In the liquid crystal dropping device of the present disclosure, the liquid crystal composition provided by each liquid crystal dropping nozzle comprises liquid crystal molecules and a reactive monomer, and the reactive monomers of the liquid crystal compositions provided by the liquid crystal dropping nozzles are different in composition or concentration.

In the liquid crystal dropping device of the present disclosure, the liquid crystal compositions provided by the liquid crystal dropping nozzles corresponding to the regions are identical when the liquid crystal panels of a same property are placed in the respective regions.

In the liquid crystal dropping device of the present disclosure, the liquid crystal panels of different properties have different sizes.

In the liquid crystal dropping device of the present disclosure, each liquid crystal dropping nozzle corresponds to a liquid crystal container and a transport pipeline; and the liquid crystal dropping nozzle communicates with the liquid crystal container via the transport pipeline, and the liquid crystal dropping nozzle is configured to draw the liquid crystal composition from the liquid crystal container and drop the liquid crystal composition onto the liquid crystal panel in a corresponding region.

In the liquid crystal dropping device of the present disclosure, compositions of the reactive monomers of the liquid crystal compositions corresponding to different regions are adjusted to form the same pretilt angle for the liquid crystal panels in different regions.

In the liquid crystal dropping device of the present disclosure, concentration of the reactive monomers of the liquid crystal compositions corresponding to different regions is adjusted to form the same pretilt angle for the liquid crystal panels in different regions.

In the liquid crystal dropping device of the present disclosure, the machine table is divided into at least two regions and the liquid crystal dropping nozzle is disposed corresponding to each of the regions. Liquid crystal compositions provided by the liquid crystal dropping nozzles corresponding to the regions are different when liquid crystal panels of different properties are placed in the respective regions. In such a way, during manufacturing products of different sizes on a same substrate, performance of each product can meet standards.

To make above content of the present invention more easily understood, it will be described in detail by using preferred embodiments in conjunction with the appending drawings.

BRIEF DESCRIPTION OF DRAWINGS

The technical schemes and other beneficial effects will be more apparent with reference to the detailed descriptions of the embodiments of the present invention below in accompaniment with the drawings.

DETAILED DESCRIPTION OF PREFERRED EMBODIMENTS

To further illustrate the technical schemes adopted in the present disclosure and their corresponding effects, preferred embodiments of the present disclosure will be described in detail with reference to the appending drawings. Obviously, the embodiments described herein are a part rather than all of the embodiments of the present disclosure. All other embodiments obtained by a person of ordinary skill in the art based on the embodiments of the present disclosure without creative efforts shall fall within the scope of the present disclosure.

Figure 1:
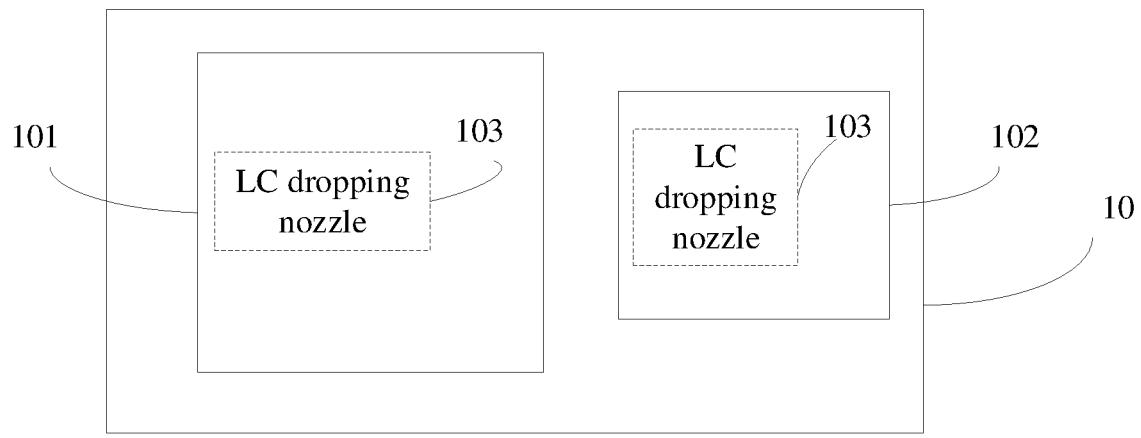
FIG. 1 is a schematic diagram showing a liquid crystal dropping device provided in accordance with a preferred embodiment of the present disclosure.

FIG. 1 is a schematic diagram showing a liquid crystal dropping device provided in accordance with a preferred embodiment of the present disclosure. As shown in FIG. 1, the present preferred embodiment provides a liquid crystal dropping device including a machine table 10 divided into at least two regions 101 and 102 and a liquid crystal dropping nozzle 103 corresponding to each of the regions 101 and 102.

Liquid crystal compositions provided by the liquid crystal dropping nozzles 103 corresponding to the regions are different when liquid crystal panels of different properties are placed in respective regions. In such a way, a same pretilt angle is formed in an alignment process for the liquid crystal panels in different regions.

Liquid crystal dropping nozzles used for different regions are same in the existing liquid crystal dropping devices, that is, liquid crystal compositions provided by the liquid crystal dropping nozzles of a same liquid crystal dropping device are identical. The liquid crystal composition includes liquid crystal molecules and a reactive monomer. The reaction rate using the reactive monomer is strongly correlated to its composition and concentration. By dividing the machine table into different regions, disposing a liquid crystal dropping nozzle for each region, and using the reactive monomers of different compositions or concentration, inconsistent reaction rates caused by using a same liquid crystal composition for the liquid crystal panels of different properties can be compensated. The regions correspond to different types of products. Accordingly, by altering the compositions or concentration of the reactive monomers, the reaction rates become identical for the liquid crystal panels of different properties, thereby forming a same pretilt angle.

In addition, when liquid crystal panels of a same property are placed in the regions, liquid crystal compositions provided by the liquid crystal dropping nozzles 103 corresponding to the regions are identical, that is, the compositions and concentration of the reactive monomers of the liquid crystal compositions are the same. In such a way, a same pretilt angle is formed for each of the liquid crystal panels.

The liquid crystal dropping device of the present disclosure serves the need of producing different types of products, and specifically, can be used to manufacture liquid crystal panels of a same property and can also be used to manufacture liquid crystal panels of different properties. It is flexible and convenient.

It is noted that the present disclosure is illustrated by manufacturing liquid crystal panels of different sizes on a same substrate, as an example. That is, the liquid crystal panels of different properties have different sizes. The present preferred embodiment is to adjust the compositions or concentration of the reactive monomers of the liquid crystal compositions to form a same pretilt angle for the liquid crystal panels of different sizes under the premise that other conditions are the same.

Figure 2:
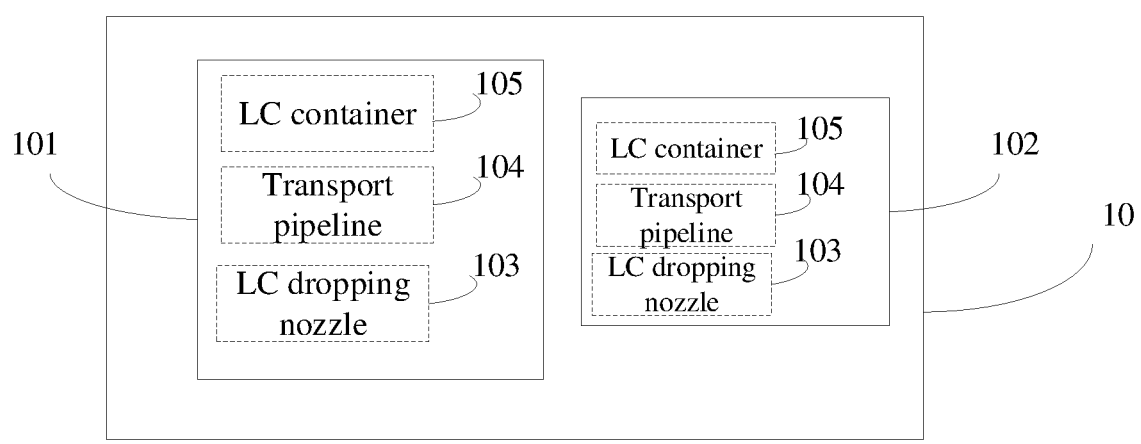
FIG. 2 is another schematic diagram showing a liquid crystal dropping device provided in accordance with a preferred embodiment of the present disclosure.

FIG. 2 is another schematic diagram showing a liquid crystal dropping device provided in accordance with a preferred embodiment of the present disclosure. As shown in FIG. 2, in the liquid crystal dropping device provided in the present preferred embodiment, the liquid crystal dropping nozzle 103 in each of the regions corresponds to a liquid crystal container 105 and a transport pipeline 104. The liquid crystal dropping nozzle 103 communicates with the liquid crystal container 105 via the transport pipeline 104. The liquid crystal dropping nozzle 103 is configured to draw the liquid crystal composition from the liquid crystal container 105 and drop the liquid crystal composition onto the liquid crystal panel in a corresponding region. It is noted that the liquid crystal composition includes liquid crystal molecules and a reactive monomer.

Preferably, when liquid crystal panels of different sizes (i.e., liquid crystal panels of different properties) are placed on the machine table, the compositions of the reactive monomers of the liquid crystal compositions corresponding to different regions are adjusted to form the same pretilt angle for the liquid crystal panels in different regions.

Preferably, when liquid crystal panels of different sizes (i.e., liquid crystal panels of different properties) are placed on the machine table, the concentration of the reactive monomers of the liquid crystal compositions corresponding to different regions are adjusted to form the same pretilt angle for the liquid crystal panels in different regions.

In the liquid crystal dropping device of the present disclosure, the machine table is divided into at least two regions and the liquid crystal dropping nozzle is disposed corresponding to each of the regions. Liquid crystal compositions provided by the liquid crystal dropping nozzles corresponding to the regions are different when liquid crystal panels of different properties are placed in the respective regions. In such a way, during manufacturing products of different sizes on a same substrate, performance of each product can meet standards.

Above all, while the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

The invention claimed is:

1. A liquid crystal dropping device comprising:
   a machine table divided into a first region for manufacturing a first display panel and a second region for manufacturing a second display panel;
   a first liquid crystal dropping nozzle disposed corresponding to the first region, for providing first liquid crystal composition to the first display panel; and
   a second liquid crystal dropping nozzle disposed corresponding to the second region, for providing second liquid crystal composition to the second display panel,
   wherein each of the first liquid crystal composition and the second liquid crystal composition comprises liquid crystal molecules and a reactive monomer, an alignment device adjusting concentration of the reactive monomers of the liquid crystal compositions corresponding to the first and second regions to form the same pretilt angle for the liquid crystal panels in the first and second regions;
   wherein in response to different sizes of the first display panel and the second display panel, the reactive monomer of the first liquid crystal composition provided by the first liquid crystal dropping nozzle for manufacturing the first display panel is different in concentration from the reactive monomer of the second liquid crystal composition provided by the second liquid crystal dropping nozzle for manufacturing the second display panel;
   wherein each of the first liquid crystal dropping nozzle and the second liquid crystal dropping nozzle corresponds to a liquid crystal container and a transport pipeline;
   wherein the first liquid crystal dropping nozzle communicates with the liquid crystal container via the transport pipeline, and the first liquid crystal dropping nozzle is configured to draw the first liquid crystal composition from the liquid crystal container and drop the first liquid crystal composition onto the first liquid crystal panel in the first region of the machine table; and
   wherein the second liquid crystal dropping nozzle communicates with the liquid crystal container via the transport pipeline, and the second liquid crystal dropping nozzle is configured to draw the second liquid crystal composition from the liquid crystal container and drop the second liquid crystal composition onto the second liquid crystal panel in the second region of the machine table.

* * * * *